United States Patent [19]

Sugimoto et al.

[11] Patent Number: 4,500,951
[45] Date of Patent: Feb. 19, 1985

[54] PLANT CONTROL SYSTEM

[75] Inventors: Norihiko Sugimoto, Katsuta; Nobuhiro Hamada, Hitachiota; Ikuro Masuda, Hitachi; Jinichi Sakurai, Mito, all of Japan

[73] Assignee: Hitachi, Ltd., Tokyo, Japan

[21] Appl. No.: 335,689

[22] Filed: Dec. 30, 1981

[30] Foreign Application Priority Data

Jan. 7, 1981 [JP] Japan .................... 56-348
Mar. 31, 1981 [JP] Japan .................... 56-46459
Apr. 20, 1981 [JP] Japan .................... 56-58488

[51] Int. Cl.³ ................ G05B 23/02; G06F 15/46
[52] U.S. Cl. ........................... 364/186; 364/133; 364/138; 364/200; 371/9
[58] Field of Search .......... 364/138, 139, 140, 184, 364/186, 131, 133, 132, 200; 371/9

[56] References Cited

U.S. PATENT DOCUMENTS

| | | | |
|---|---|---|---|
| 3,939,329 | 2/1976 | Doran | 364/140 |
| 4,100,597 | 7/1978 | Fleming et al. | 364/474 |
| 4,123,794 | 10/1978 | Matsumoto | 371/68 |
| 4,124,889 | 11/1978 | Kaufman et al. | 364/200 |
| 4,129,901 | 12/1978 | Masuda | 364/184 |
| 4,136,384 | 1/1979 | Okada et al. | 364/200 |
| 4,141,066 | 2/1979 | Keiles | 364/186 |
| 4,209,840 | 6/1980 | Berardi et al. | 364/200 |
| 4,251,858 | 2/1981 | Cambigue et al. | 364/132 |
| 4,281,379 | 7/1981 | Austin | 364/132 |
| 4,304,001 | 12/1981 | Cope | 364/138 |

Primary Examiner—Jerry Smith
Assistant Examiner—John R. Lastova
Attorney, Agent, or Firm—Antonelli, Terry & Wands

[57] ABSTRACT

In a plant control system, a transmission channel includes loop transmission lines arranged in duplex. Equivalently connected to this transmission channel are a plurality of one-loop controller stations, a backup station backing up a disabled one of the plural controller stations and a display station for displaying the status of the controller stations and the backup station. Each of the controller stations, backup station and display station includes a built-in microcomputer. Each of these stations includes also a transmission interface circuit and a self-diagnostic circuit. The transmission interface circuit in each station selects one of the transmission lines for data transmission between its own station and the others. The self-diagnostic circuit in each station detects the presence of failure of normal operation of its own station and disconnects the disabled station from the transmission line, so that the other stations may not be adversely affected by the disabled station.

5 Claims, 11 Drawing Figures

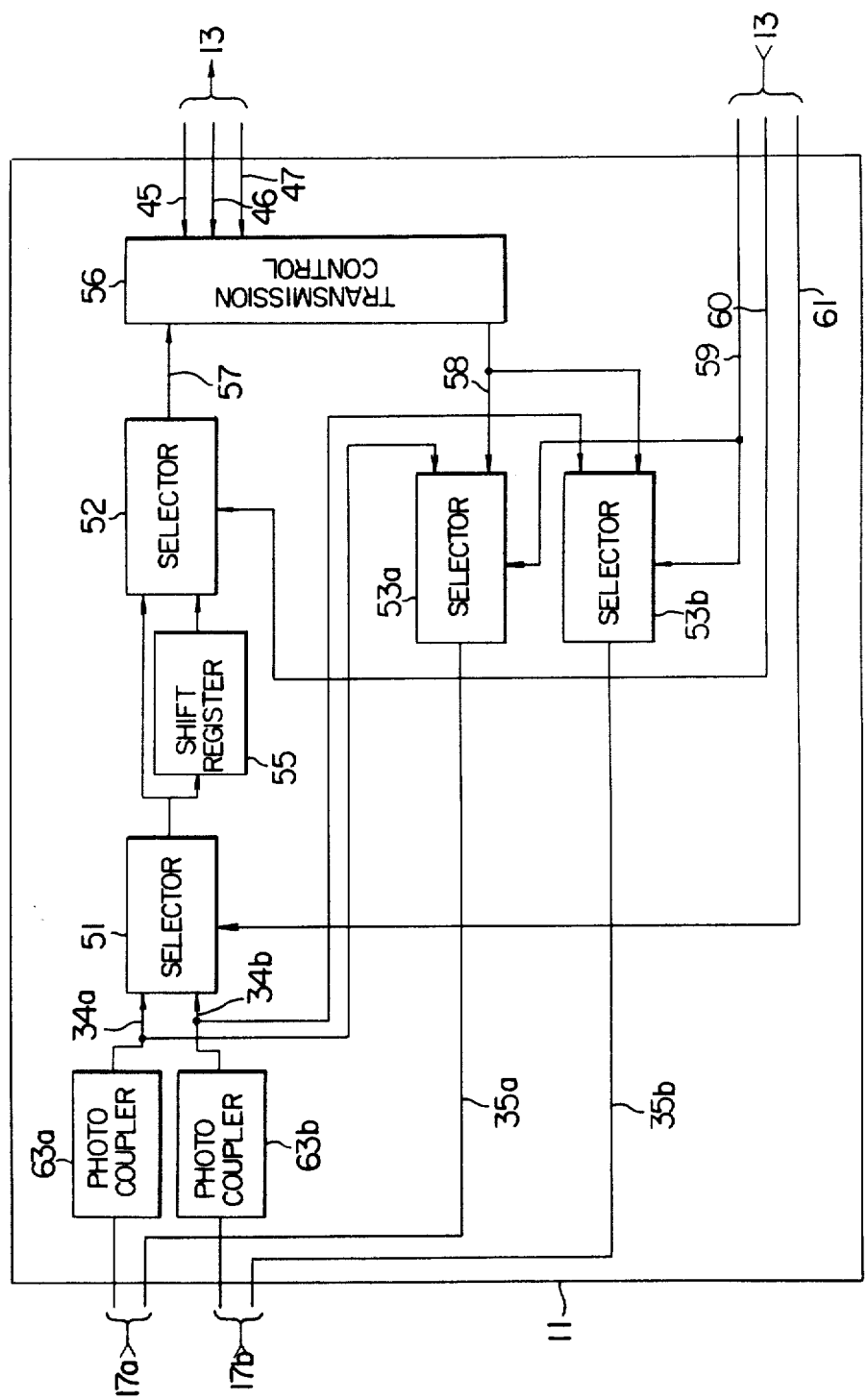

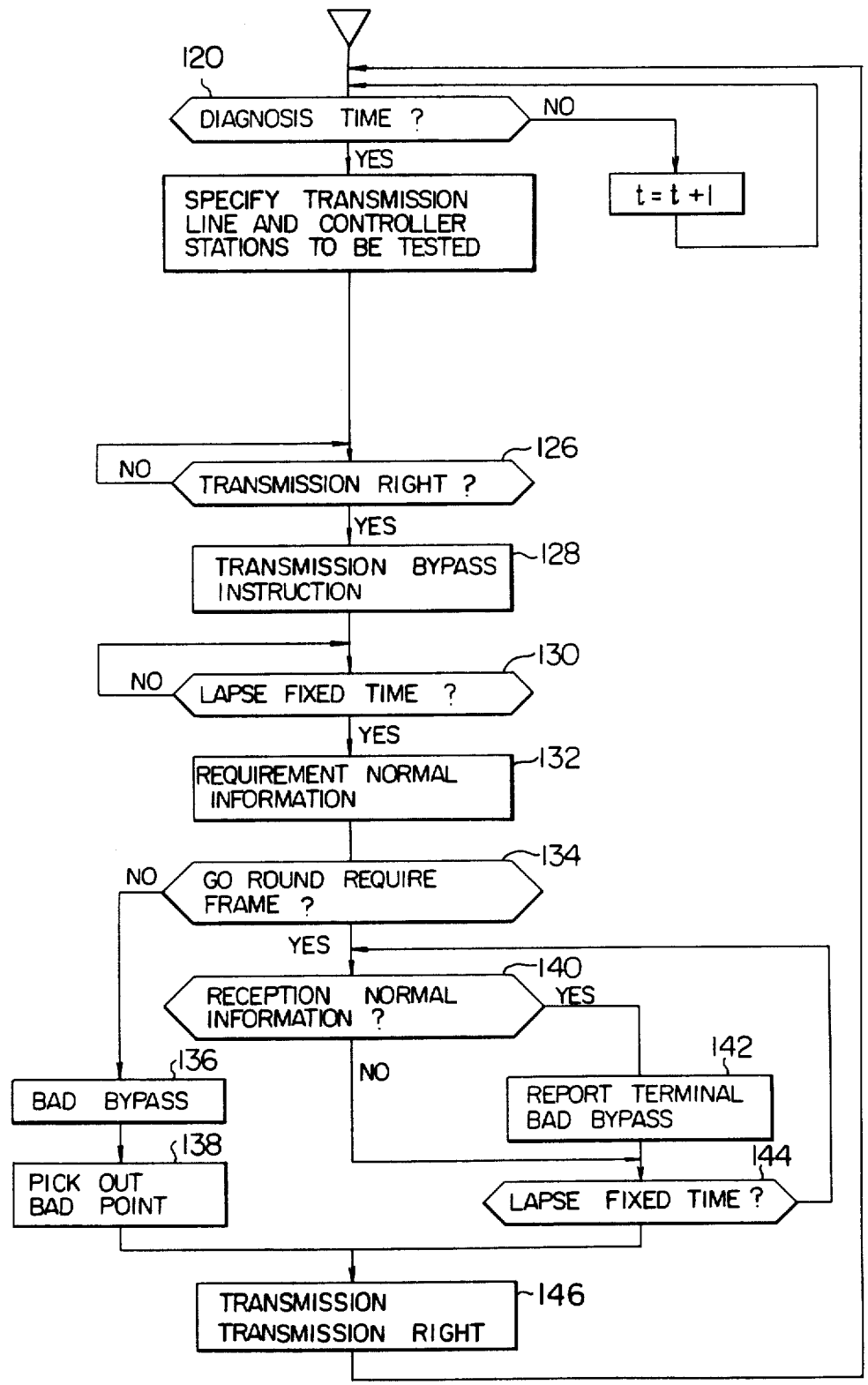

PLANT CONTROL SYSTEM

BACKGROUND OF THE INVENTION

This invention relates to a plant control system, and more particularly to a plant control system of the so-called distributed control type in which a separate control loop is provided for each of a plurality of different control functions.

With the remarkable progress of microcomputers in recent years, the distributed-type plant control system tends to employ a microcomputer controller, in place of the conventional analog controller, in each of the control loops provided individually to different analog or digital control objects. In such a distributed-type plant control system, a plurality of controllers each including a microcomputer therein (which controllers will be referred to hereinafter as controller stations) and a display device or station for providing centralized monitoring and displaying by means such as a cathode-ray tube (CRT) are connected to one another by a transmission channel so that data transmission among the stations can be controlled.

As a known transmission control system for plant control of the distributed control type as above described, there is a so-called data highway system in which the transmission channel is provided in the form of a loop transmission line. For example, U.S. Pat. No. 4,136,384 discloses such a data highway system in which a transmission control unit is provided on the transmission channel for controlling data transmission and data is transmitted between a plurality of controller stations and a display station under control of the transmission control unit. Thus, a special-purpose transmission control unit is inevitably required in such a transmission control system. Therefore, the overall system has not the freedom of expansibility, and this leads not only to low transmission efficiency but also to low reliability.

SUMMARY OF THE INVENTION

It is therefore a primary object of the present invention to provide a novel and improved plant control system in which the individual controller stations can equivalently participate in the data transmission without the necessity for connection of such a special-purpose transmission control unit to the transmission channel, thereby ensuring high reliability and increasing the freedom of expansibility.

The plant control system according to the present invention is featured by the fact that a plurality of controller stations and a display station are connected to a loop transmission channel and include transmission interface circuits and self-diagnostic circuits common to all of them, so that all of the controller stations can equivalently participate in data transmission, and trouble occurring in one of the controller stations will not adversely affect the function of the remaining controller stations.

BRIEF DESCRIPTION OF THE DRAWINGS

FIG. 4 is a block diagram showing the structure of one of the transmission interface circuits shown in FIG. 1.

FIGS. 7 and 8 are flow charts illustrating how the capability of transmission line bypass operation of the individual stations is checked in the embodiment of the present invention.

DESCRIPTION OF THE PREFERRED EMBODIMENTS

A preferred embodiment of the plant control system according to the present invention will now be described in detail with reference to the drawings.

In the embodiment as described hereinafter, it is an aim to provide the following features. It is the first feature that the right in transmission control is shifted from one controller station to another in a sequential order so that all the controller stations can be equivalently connected to a loop transmission channel, thereby permitting a high degree of system expansibility and eliminating the bottleneck obstructing a high reliability. According to the second feature, each of the controller stations has the function of self-diagnosis as to whether or not its microcomputer is normally operating and also as to whether or not its transmission interface circuit is normally operating on the basis of the presence or absence of a level change in data transmitted thereto. It is the third feature that the transmission interface circuits and self-diagnosis circuits in all of the controller stations have the same structure. According to the fourth feature, the transmission channel connecting the controller stations, including electronic circuits provided thereto, is divided into sub-channels or loops which are controlled respectively by the individual stations, so that the system can perform data transmission in a normal manner so long as either one of the loops is under the normal condition. It is the fifth feature that, in order that a disabled controller station, if any, may not interfere with data transmission over the transmission channel, a bypass relay is provided in each station to be periodically operated in response to a command derived from a bypass command generating circuit thereby to minimize the probability of failure of normal operation of the system due to occurrence of the disabled station.

It is the sixth feature that each of the transmission loop lines constituting the transmission channel is connected through an electrical isolator and a driver respectively to the input and output of the associated controller station so as to minimize the probability of shutdown of the system due to possible electrical contact between the transmission lines. It is the seventh feature that the operation of the bypass relays is periodically tested as a group so as to shorten the time required for the diagnosis. It is the eighth-feature that, in the presence of an idle signal during a time interval between two adjacent frames, the level of the output signal of the transmission control circuit in a particular controller station is maintained constant or is not changed so as to minimize the probability of confusion between the normal and abnormal operating conditions of the station.

Figure 1:
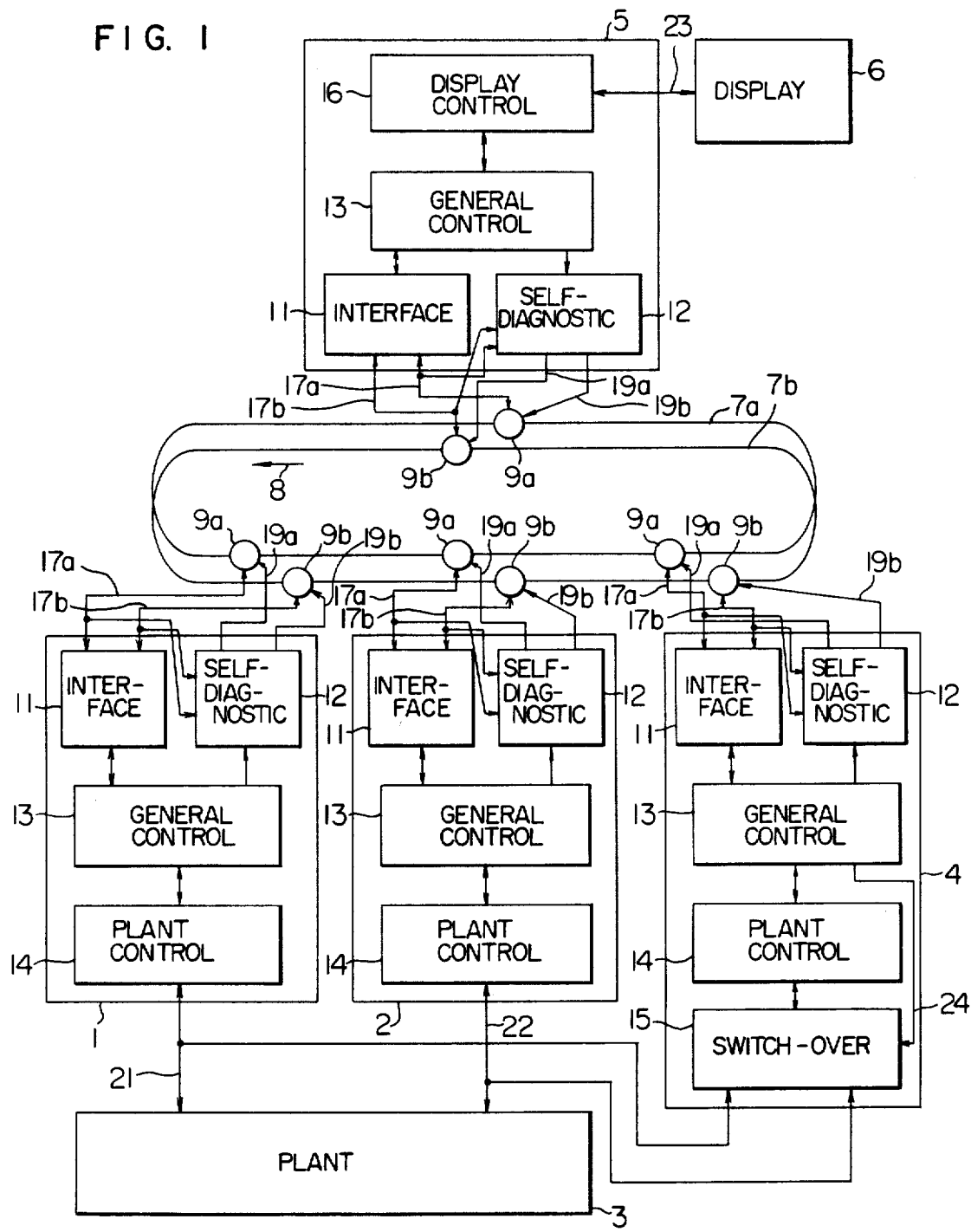
FIG. 1 is a systematic diagram showing the structure of a preferred embodiment of the plant control system according to the present invention.

FIG. 1 shows the general structure of a preferred embodiment of the plant control system according to the present invention. Referring to FIG. 1, a plurality of controller stations 1 and 2 each including a microcomputer for the purpose of one-loop control are connected to a plant 3 by plant control signal lines 21 and 22 respectively to control the plant 3. Each of the controller stations 1 and 2 is connected, on the other hand, to a pair of loop transmission lines 7a and 7b through signal transmitting and receiving lines 17a, 17b and switches 9a, 9b respectively. In the present invention, such a pair of loop transmission lines 7a and 7b are provided to constitute a duplex transmission channel. In the description of the present invention, the suffixes a and b are added to the reference numerals designating the elements associated with the two loop transmission lines 7a and 7b respectively so as to facilitate the understanding of the illustration.

A display station 5 is similarly connected to the loop transmission lines 7a and 7b through signal transmitting and receiving lines 17a, 17b and switches 9a, 9b respectively. The display station 5 is connected, on the other hand, to a display unit 6 through a display signal line 23 to display the status of the plant 3 on the display unit 6. Keyed-in data to be displayed on the display unit 6 is supplied to the display station 5 by the transmission lines 7a and 7b.

An N:1 backup station 4, which controls the plant 3 in lieu of a disabled station, if any, of the plural controller stations, is similarly connected to the transmission lines 7a and 7b through signal transmitting and receiving lines 17a, 17b and switches 9a, 9b respectively.

The switches 9a and 9b connected between the transmission lines 7a, 7b and the individual stations 1, 2, 4, 5 are controlled by switch drive signals applied through signal lines 19a and 19b respectively.

Each of the controller stations 1 and 2 includes a transmission interface circuit 11 participating in the transmission control, a self-diagnostic switch-over and disconnect circuit 12 for diagnosing the status of the associated station and controlling the switch drive signals lines 19a and 19b connected to the respective switches 9a and 9b, a plant control circuit 14 for controlling the plant 3, and a general control circuit 13 including a microcomputer used for the overall control of the circuits 11, 12 and 14. The structures of the transmission interface circuit 11, self-diagnostic switch-over and disconnect circuit 12 and plant control circuit 14 are common to not only the controller stations 1 and 2 but also the N:1 backup station 4 and display station 5. The N:1 backup station 4 includes, besides the circuits 11, 12, 13 and 14 constituting each of the controller stations 1 and 2, a signal switch-over circuit 15 for switching over the plant control signal lines 21 and 22 when one of the controller stations 1 and 2 is disabled.

The display station 5 includes a display control circuit 16 besides the common circuits 11, 12 and 13. The stations 1, 2, 4 and 5 are each formed by mounting its component circuits on a single printed circuit board.

Figure 2:
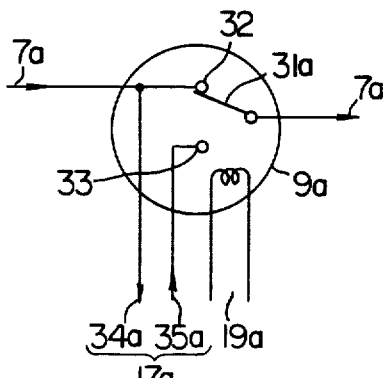
FIG. 2 is a diagram showing the structure of one of the switches shown in FIG. 1.

Connections between the loop transmission line 7a and the switch 9a and between the switch 9a and the associated station will be described with reference to FIG. 2. Consider, for example, the above connections in the case of the controller station 2 which is located downstream relative to the controller station 1 in the direction of data transmission shown by the arrow 8 in FIG. 1. The portion of the transmission line 7a extending from the upstream controller station 1 is connected to a first contact 32 of a switch (a bypass relay) 31a and to a signal receiving conductor 34a of the controller station 2. A second contact 33 of the switch (bypass relay) 31a is connected to a signal transmitting conductor 35a of the controller station 2. The signal appearing on one of the contacts 32 and 33 to which the switch 31a is connected is transmitted to the downstream controller station (not shown) by way of the transmission line 7a. More precisely, when the switch drive signal applied through the signal line 19a in the controller station 2 instructs "bypass", or when the controller station 2 is disconnected from the system, or when the power source in the controller station 2 is turned off, the switch (bypass relay) 31a is connected to the contact 32, and the transmission line 7a bypasses the controller station 2. When, on the other hand, the switch drive signal applied through the signal line 19a instructs "turn-on", the switch (bypass relay) 31a is connected to the contact 33, and the controller station 2 receives data transmitted from the controller station 1 by way of the transmission line 7a and transmits the data to the downstream controller station (not shown) by way of the transmission line 7a. Connections between the transmission line 7b and the switch 9b and between the switch 9b and the associated station are the same as those shown in FIG. 2.

Figure 3:
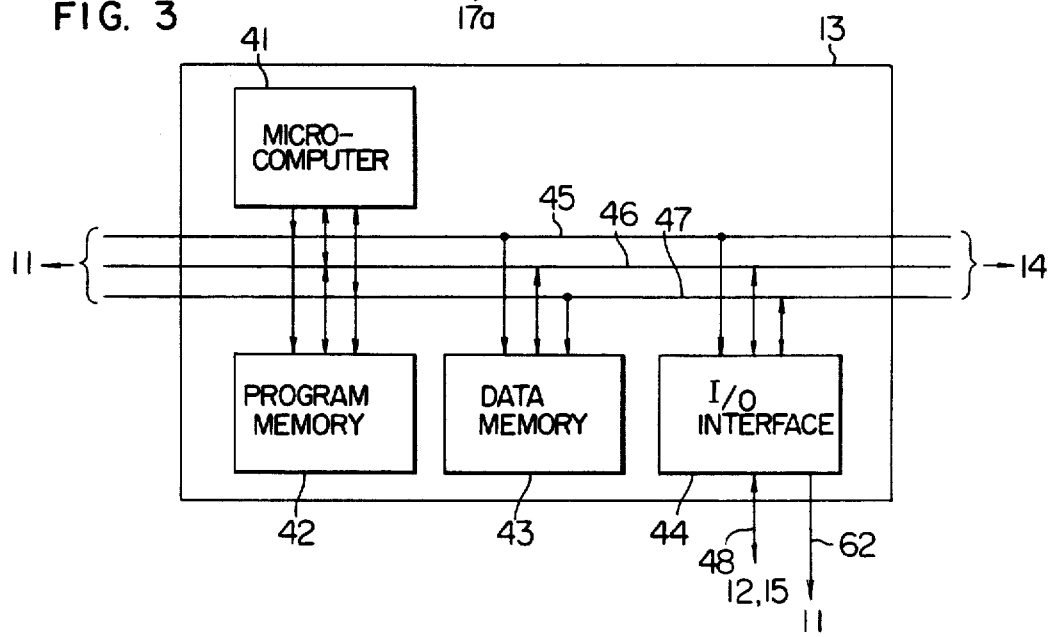
FIG. 3 is a block diagram showing the structure of one of the general control circuits shown in FIG. 1.

The structure of one form of the general control circuit 13 will be described with reference to FIG. 3. Referring to FIG. 3, this control circuit 13 includes a microcomputer 41, a program memory 42, a data memory 43, an input/output interface circuit 44, a data bus 45, an address bus 46 and a control bus 47. The microcomputer 41 executes the overall control of the circuits constituting the associated station. The program memory 42 and data memory 43 store general programs and data which are required for performing the functions of transmission control, switch control and self-diagnosis common to the individual stations and also specific programs and data relating to the functions specific to the associated station such as the function of plant control in the controller stations 1 and 2, the functions of plant control and plant switch-over control in the N:1 backup station 4 and the function of display control in the display station 5.

The input/output interface circuit 44 generates an input/output control signal 48 which controls the self-diagnostic switch-over and disconnect circuit 12 in the associated station and the signal switch-over circuit 15 in the N:1 backup station 4. The input/output interface circuit 44 generates also a control signal 62 which controls the transmission interface circuit 11 in the associated station. The data bus 45, address bus 46 and control bus 47 are used for the control of the transmission interface circuit 11 and the plant control circuit 14 in the associated station.

Although, in the illustrated embodiment of the present invention, the general control circuit 13 is described as being composed of the microcomputer 41, program memory 42, data memory 43, input/output interface circuit 44, data bus 45, address bus 46 and control bus 47, these functions may be incorporated into, for example, a one-chip microcomputer without adversely affecting the objects of the present invention. Further, a part or all of the functions of the transmission interface circuit 11 and the self-diagnostic switch-over and disconnect circuit 12 may be incorporated therein.

The structure of the transmission interface circuit 11 will be described with reference to FIG. 4. Referring to FIG. 4, data transmitted via the two transmission lines 7a and 7b are supplied through the receiving lines 17a, 17b, photo couplers 63a, 63b and receiving conductors 34a, 34b respectively to a first selector 51, and one of the received data inputs is selected by the selector 51 in response to the application of a transmission-line select signal 61 which instructs selection of one of the two transmission lines 7a and 7b. The first selector 51 is connected at its output terminal to one of the input terminals of a second selector 52 directly and to the other input terminal of the second selector 52 through a shift register 55. The second selector 52 selects one of the two input signals in response to the application of a go-ahead (GA) signal 60. More precisely, in a controller station having the transmission right (GA) for data transmission over one of the transmission lines 7a and 7b, the second selector 52 receives the data output applied from the first selector 51 with a delay of a fixed period of time through the shift register 55. On the other hand, in a controller station not having the transmission right (GA) for data transmission over one of the transmission lines 7a and 7b, the second selector 52 selects the data output applied directly from the first selector 51, and such a data input is applied to a transmission control circuit 56.

The transmission control circuit 56 possesses the function of executing an operating sequence similar to that of the HDLC (high data link controller) or SDLC (serial data link controller) standardized in the field of transmission control. The data bus 45, address bus 46 and control bus 47 in the general control circuit 13 are connected to the transmission control circuit 56 for setting the mode of transmission control and for connecting the transmitted and received data to the microcomputer 41.

Data outputs from selectors (drivers) 53a and 53b are applied to the transmission line 7a and 7b through transmitting conductors 35a and 35b respectively. The selector 53a functions to select one of the two input signals, that is, the data input received through the receiving conductor 34a and the data input 58 applied from the transmission control circuit 56, in response to the application of an off-loop signal 59. The data input applied from the transmission control circuit 56 is normally selected by the selector 53a and is applied to the transmission line 7a by way of the transmitting conductor 35a. However, in the off-loop mode which occurs during the mode change process where the condition of data transmission over the transmission line 7a is changed from the on-loop mode to the 1:1 mode or vice visa through the off-loop mode, the data input transmitted by way of the transmission line 7a and received through the receiving conductor 34a of the particular controller station is selected to provide the data output to be transmitted again over the transmission line 7a.

The function of the selector 53b is the same as that of the selector 53a, except that the data input is received through the receiving conductor 34b instead of the receiving conductor 34a, and the data output appears on the transmitting conductor 35b.

The input/output interface circuit 44 applies to the off-loop signal 59, the GA signal 60 and the transmission-line select signal 61. However, the off-loop signal 59 and the GA signal 60 may be applied from the transmission control circuit 56.

Figure 5:
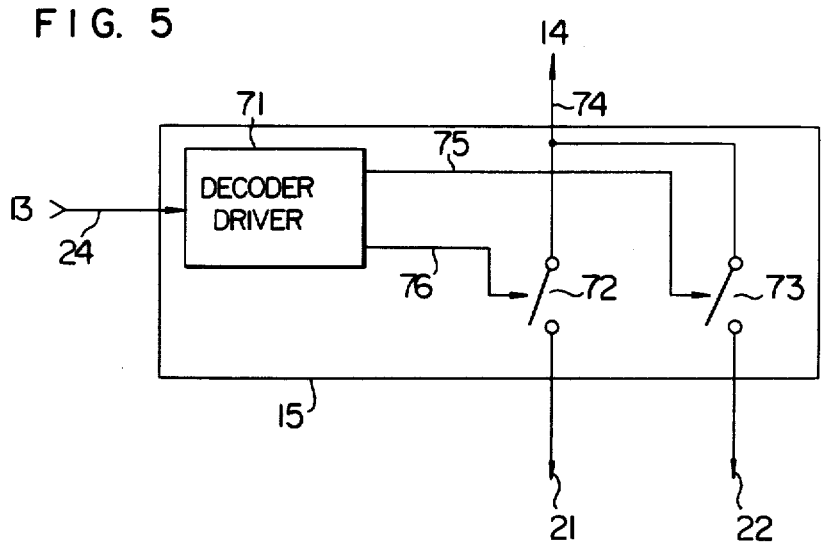
FIG. 5 is a block diagram showing the structure of the signal switch-over circuit shown in FIG. 1.

The structure of the signal switch-over circuit 15, which is one of the components of the N:1 backup station 4, will be described with reference to FIG. 5. The general control circuit 13 in the N:1 backup station 4 applies a switch-over signal 24 to a decoder driver 71. This switch-over signal 24 indicates the address number of a disabled controller station to be backed up and instructs also as to whether or not such a controller station is to be backed up. When the controller station 1 is to be backed up, a switch 72 is turned on, and the plant control signal line 21 is connected through the switch 72 to a plant signal line 74 which is connected to the plant control circuit 14. The switch 72 is turned on by a switch drive signal 76. When, on the other hand, the controller station 2 is to be backed up, another switch 73 is turned on, and the plant control signal line 22 connected through the switch 73 to a plant signal line 74 which is connected to the plant control circuit 14. The switch 73 is turned on by a switch drive signal 75. The switches 72 and 73 are provided for the purpose of electrically isolating the N:1 backup station 4 from the controller stations, and it is apparent that any other suitable isolating means may be provided. When the plant control system does not require any electrical isolation between the N:1 backup station and the controller stations, the switch-over signal 24 and the decoder may be used to directly select one of the plant control signals depending on the indication of the switch-over signal.

The structure of the self-diagnostic switch-over and disconnect circuit 12 will be described with reference to FIG. 6. The self-diagnostic switch-over and disconnect circuit 12 functions to place one of the switches 9a and 9b in its "on" position, while placing the other in its "bypass" position, so that one of the two transmission lines 7a and 7b can be selected for data transmission. Also, the self-diagnostic switch-over and disconnect circuit 12 possesses the function of self-diagnosing failure of normal operation of the associated station when the control circuit 13 or the transmission interface circuit 11 in the station is disabled, thereby disconnecting the disabled station from both of the two transmission lines 7a and 7b. The above function of the self-diagnostic switch-over and disconnect circuit 12 is based on the fact that when the control circuit 13 is normal, it generates a periodically recurring pulse signal and the levels of both transmitted data and received data change necessarily within a predetermined period of time.

Figure 6:
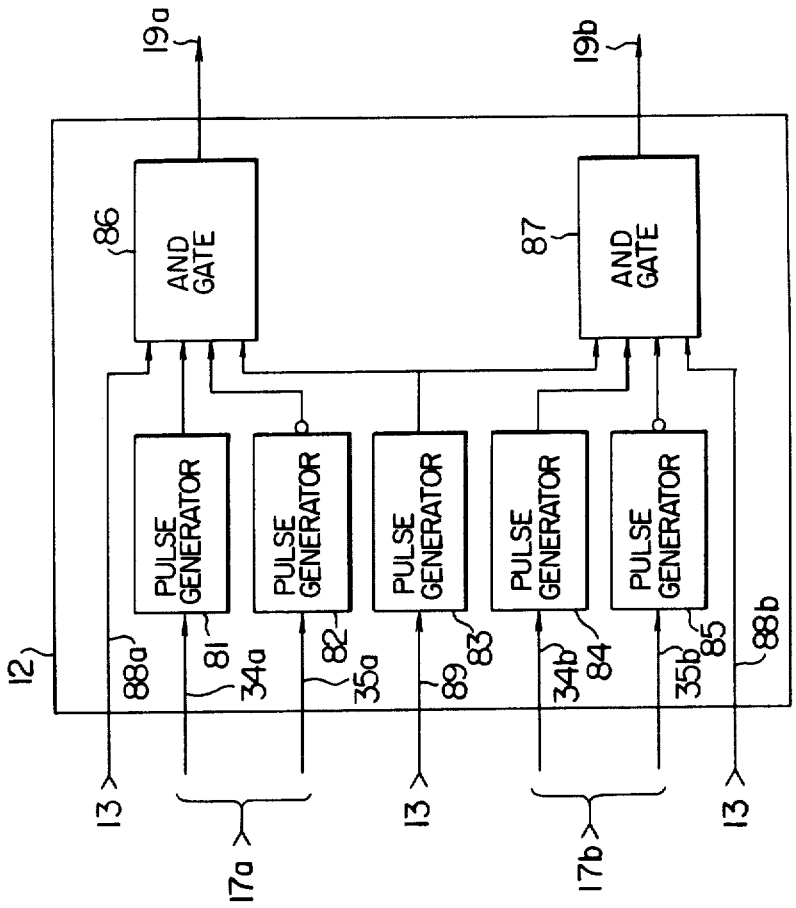
FIG. 6 is a block diagram showing the structure of one of the self-diagnostic switch-over and disconnect circuits shown in FIG. 1.

Referring to FIG. 6, pulse generating circuits 81 and 84 generate pulse signals including a pulse appearing each time the level of the data received through the respective receiving conductors 34a and 34b changes between "1" and "0". Pulse generating circuits 82 and 85 generate pulse signals including a pulse appearing each time the level of the data transmitted through the respective transmitting conductors 35a and 35b changes between "1" and "0". Similarly, a pulse generating circuit 83 generates a pulse signal including a pulse appearing each time the level of a normal-condition indicative pulse signal 89 generated from the control circuit 13 changes between "1" and "0". More precisely, each of the pulse generating circuits 81 to 85 generates a pulse of constant pulse width in response to a level change in the input signal and then generates another pulse of constant pulse width when the next level change occurs in the input signal within a predetermined period of time. Thus, each of the pulse generating circuits 81 to 85 generates a pulse signal of constant pulse width when the level change occurs in the input signal within a predetermined period of time. However, no pulse signal appears from each of the pulse generating circuits 81 to 85 when an abnormal condition occurs resulting from the absence of the level change in the input signal.

The switch drive signals applied through the signal lines 19a and 19b are also provided by switch control signals 88a and 88b which are applied from the general control circuit 13 to AND gates 86 and 87 respectively. It will thus be seen that the condition for placing the switches 9a and 9b in their "on" positions by the respective switch drive signals applied through the signal lines 19a and 19b is expressed as follows:

"On" position = (switch control signal 88) ·

(control circuit 13 being normal) · (presence of received data) ·

$\overline{\text{(absence of transmitted data)}}$

It will be seen that the switch drive signals applied through the signal lines 19a and 19b are determined by the respective switch control signals 88a and 88b when both of the transmission interface circuit 11 and the control circuit 13 are normal or not disabled. On the other hand, the particular controller station is abnormal or disabled when no level change occurs in the normal-condition indicative pulse signal 89 generated from the control circuit 13 or when the data output being transmitted is not correct although the received data input is correct. In such a case, the switch drive signals applied through the signal lines 19a and 19b turn the respective switches 9a and 9b into their "bypass" positions, and the particular controller station is automatically disconnected from the transmission lines 7a and 7b so that any adverse effect due to the abnormal operation may not be exerted on the remaining controller stations.

The operation of the embodiment of the present invention will now be described. In the illustrated embodiment, four stations of the controller stations 1 and 2, N:1 backup station 4 and the display station 5 are equivalently connected to the loop transmission lines 7a and 7b constituting a duplex transmission channel so that data transmission therebetween can be carried out.

In the duplex transmission system of the present invention, the control module described with reference to the prior art can be omitted and the individual controller stations are equivalently connected to the transmission system. More precisely, the transmission right is given to only one controller station at any time, and this transmission right is sequentially transferred in the downstream controller stations in the direction of data transmission over the transmission lines.

Any controller station, which is ready for data transmission to another controller station, starts the data transmission when it receives the transmission right, and, upon completion of the data transmission, the transmission right is transferred to the next controller station. When a controller station, which is not ready for data transmission, is given the transmission right, this transmission right is directly transferred to the next controller station. In the explanation of the embodiment of the present invention, the term "GA" (go ahead) is applied to the transmission command representative of the transmission right. According to such a transmission arrangement, the transmission right is sequentially transferred so that the individual controller stations can equivalently use the transmission lines for data transmission.

Each of the controller stations sends data indicative of the normal or trouble-free condition of that station, when it operates normally, at predetermined time intervals to the N:1 backup station 4 and display station 5, but does not when it is abnormal. The stations 4 and 5 receiving the data from the stations 1 and 2, therefore, can judge that the stations 1 and 2 are normal. The N:1 backup station 4 backs up the controller stations 1 and 2, and the display station 5 displays the status of the controller stations 1, 2 and the backup station 4.

Upon finding failure of normal operation of any one of the controller stations 1 and 2, the disabled controller station is disconnected from the plant 3 by disconnection of the plant control signal line 21 or 22 from the plant 3. Under control of the switch-over signal 24, the switch-over circuit 15 in the N:1 backup station 4 switches over the plant control signal line which has been connected to the disabled controller station, so that the N:1 backup station 4 then controls the plant 3 in place of the disabled controller station.

Because of the fact that each of the controller stations 1 and 2, when normal, is periodically transmitting a signal indicative of the status of the plant 3 to the N:1 backup station 4, the N:1 backup station 4 can continuously control the plant 3, after the necessary switchover procedure, in place of the disabled controller station.

While the N:1 backup station 4 is controlling the plant 3 in place of the disabled controller station, the operator having identified the disabled controller station by observation of the status display on the display unit 6 is allowed to restore the disabled controller station to the original normal condition. After the disabled controller station has been disconnected from the transmission lines 7a and 7b, and the associated switches 9a and 9b have been placed in the "bypass" position as will be apparent from the foregoing description, the other or normal controller station can utilize the transmission lines 7a and 7b without interference by the disabled one. Even after the disabled controller station is repaired or a new controller station is inserted in the transmission lines 7a and 7b, the associated switches 9a and 9b are left in their "bypass" position until the control circuit 13 of the particular controller station is set at its initial condition. The switches 9a and 9b are placed in their "on" position after the control circuit 13 of the particular controller station is set in the initial condition. In such a case, the transmission line used for the data transmission may be identified, and only the corresponding one of the switches 9a and 9b may be placed in the "on" position.

The method of detecting transmission failure occurring in one of the transmission lines and the switching over from the failed one to the normal one will now be described.

Suppose now that data transmission is continued over one of the transmission lines 7a and 7b, for example, the transmission line 7a, and any one or a plurality of the system components including the transmission line 7a, switches 9a and interface circuits 11 in the controller stations 1 and 2 are disabled. Then, it becomes necessary to continue the data transmission by switching over to the other transmission line 7b. Each frame transmitted over the transmission line includes data transmitted between the controller stations or the transmission right command, and a transmission command appears necessarily over the transmission line within a predetermined period of time. However, when for example, any one of the transmission line 7a and the system components associated with or included in the controller station 1 is disabled, the downstream controller station 2 is unable to receive the frame being transmitted.

When the controller station 2 detects that it is unable to receive the frame within a period of time longer than the predetermined period of time, the transmission-line select signal 61 is applied to the selector 51 in the transmission interface circuit 11 of the controller station 2, and the transmission control circuit 56 now receives data being transmitted over the other transmission line 7b. Further, if the selector 53a were disabled, erroneous data might be transmitted over the transmission line. Therefore, the switch drive signal line 19a is so actuated as to place the switch 9a in its "bypass" position, so that the transmission line 7b may not be adversely affected by the transmission interface circuit 11 in which the selector 53a is disabled.

The embodiment of the present invention is illustrated to include only two controller stations 1 and 2 for simplicity of explanation. It is apparent, however, that, by preliminarily providing a required number of switches 9a and 9b on the transmission lines 7a and 7b and providing more signal switch-over circuits 15 in the N:1 backup station 4 thereby increasing the backup capacity of the N:1 backup function, the number of controller stations and line-connecting switches can be increased as desired and set in any desired positions thereby permitting a high degree of system expansibility. Further, by virtue of the self-diagnostic function and the line switch-over and disconnecting function in each of the controller stations and also by virtue of the controller backup function of the N:1 backup station, it is possible to improve the reliability of the data transmission system in which all of the stations are equivalently connected to the two transmission lines. In addition, the transmission interface circuit 11 and the self-diagnostic switch-over and disconnect circuit 12 connected to the transmission lines have the structures common to all of the stations and can, therefore, be easily integrated into the form of an LSI. Furthermore, by employment of the common LSIs' including the parts of the individual stations, the various parts of each of the stations can be mounted on a single printed circuit board, so that the plant control system can be further miniaturized and standardized.

The method of group check of the capability of the line bypass operation of the controller stations will now be described with reference to the flow charts of FIGS. 7 and 8.

It is undesirable from the aspect of satisfactory plant control that, when a controller station is left in a state in which it is unable to make a line bypass operation, or when an abnormal condition occurs in its CPU or in its transmission control circuit, a disabled controller station is connected to the transmission lines 7a and 7b.

In this connection, it is undesirable to conduct individually a bypass operation test for each of the controller stations because it causes transmission interference to occur at random resulting in reduced transmission efficiency.

To deal with such a situation, a required number of diagnostic stations each including the same transmission interface circuit and self-diagnostic circuit as those of the controlling stations may be connected to the transmission lines in the present invention, and the timing of execution of the bypass operation test may be controlled for detecting a faulty controller station. Such a diagnostic station may be the same as the N:1 backup station.

Figure 7:
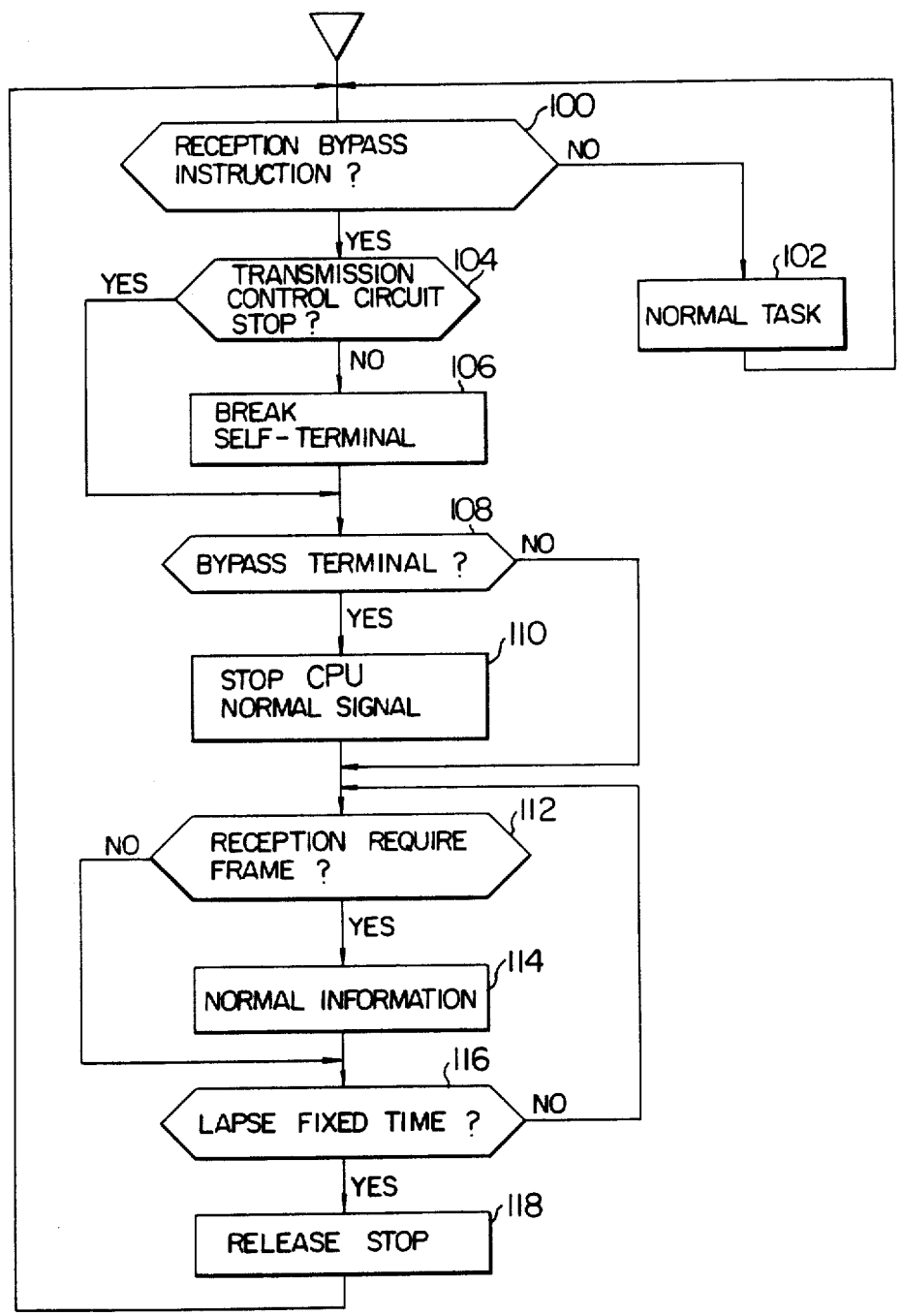

FIG. 7 shows the flow of testing steps conducted in the controller station. In a judging step 100, judgment is made as to whether or not a line bypass instruction has been received. When the result of judgment proves that such an instruction has not yet been received, the normal task is executed in a processing step 102. When, on the other hand, the result of judgment proves that the line bypass instruction has been received, judgment is made in a judging step 104 as to whether the transmission control circuit 56 is working or not and hence whether it is allowed to stop the operation of the control circuit or not. For this purpose, the presence or absence of the switch drive signal applied through the switch drive signal line 19a is judged. When the result of judgment in the step 104 proves that stopping the operation is impossible, the particular controller station is judged to be faulty or disabled in a processing step 106. If the transmission control circuit 56 should continue to generate its output regardless of the control, a self-diagnostic circuit of complex hardware structure would be required resulting in reduced system reliability. This is because a self-diagnostic circuit of simple structure will not be able to reliably detect failure. Thus, the double check arrangement based on the diagnosis by the hardware diagnostic circuit and the diagnosis by the CPU will not be substantially composed, and an insufficient self-diagnostic system will result.

On the other hand, when the result of judgment in the step 104 proves that the output from the circuit 56 can be stopped, the process proceeds to a judging step 108 in which judgment is made as to whether or not the particular controller station should make the line bypass operation in response to the line bypass instruction. When the result of judgment proves that the particular controller station should make the line bypass operation, generation of the CPU normal signal is stopped for a predetermined length of time in a processing step 110. In a judging step 112, judgment is made as to whether or not a normal information require frame which requests each station to report the results of its self-diagnosis has been received. When the result of judgment proves that such a frame has been received, the particular controller station transmits the normal information in a processing step 114. Thus, although the particular controller station transmits the normal information in the step 114, this information will not arrive at the diagnostic station, since the transmission line is bypassed when the self-diagnostic circuit in that station is normal. On the basis of whether or not the normal information arrives at the diagnostic station, the diagnostic station can diagnose as to whether or not the particular controller station is normally operating. Whether or not a fixed period of time has elapsed is then judged in a judging step 116, and, when the result of judgment proves that the fixed period of time has elapsed, the CPU normal signal is released from the stopped condition in a processing step 118.

FIG. 8 shows the flow of the bypass operation test conducted by the diagnostic station. In a processing step 120, the diagnostic station applies a diagnostic instruction to the individual controller stations at a diagnosis time interval of, for example, 10 minutes. In a processing step 122, the diagnostic station specifies one of the transmission lines 7a and 7b and also specifies the group of controller stations to be tested which may be even-numbered or odd-numbered stations. A controller station which has already been judged to be unable to make the line bypass operation is excluded from the group. In a judging step 126, the diagnostic station checks the presence or absence of the transmission right, and, only when the result of judgment proves that the transmission right is present, the diagnostic station issues the line bypass instruction in a processing step 128. After the diagnostic station has issued the line bypass instruction, judgment is made in a judging step 130 as to whether or not a fixed period of time has elapsed. This fixed period of time is determined by taking into account the delay time of diagnosis by the self-diagnostic circuit and the length of time required for energization of the bypass relays. When the result of judgment in the step 130 proves that the fixed period of time has elapsed, the normal information require frame is transmitted in a processing step 132.

In a judging step 134, whether or not the normal information require frame has gone round the loop is judged. When the result of judgment proves that the frame has not gone round the loop, the presence of a bad bypass connection due to malfunction of any one of the bypass relays is detected in a processing step 136. Then, in a processing step 138, a bad-point pick-out routine is run to find the point of bad bypass connection. On the other hand, when the result of judgment in the step 134 proves that the frame has gone round the loop, this means that the normal information regarding self-diagnosis from the particular controller station has bypassed and hence not reached the diagnostic station. Then, in a judging step 140, whether or not the normal information is received is judged or confirmed. In the controller station from which the normal information is applied to the diagnostic station, a point of bad bypass connection is present, and this fact is displayed on the display unit by the display station in a processing step 142. In a judging step 144, judgment is made as to whether or not a fixed period of time has elapsed, and, when the result of judgment proves so, the transmission right is transferred to another controller station in a processing step 148.

The advantages, especially, the highly reliable operation of the embodiment of the present invention will now be described.

(1) The transmission channel includes duplex transmission lines 7a and 7b which are associated with the individual controller stations respectively and are thus independent of each other. Therefore, there is no possibility of shutdown of the transmission system unless double failure occurs in the transmission line portions belonging to the same station. This means that the failure rate can be made very small compared with the prior art duplex transmission system in which all the controller stations select the line a or b at the same time. Thus, the system failure rate can be reduced to 1/N, where N is the number of connected controller stations.

(2) The probability of occurrence of double failure in the transmission line portions belonging to the same controller station is greatly reduced by employment of the following measures:

(i) When any one of the controller stations is disabled, such a station is bypassed through one of the bypass relays 31a and 31b which are provided in duplex so that malfunction of one of them (impossibility of bypassing due to mal-contact) may not adversely affect the plant control.

(ii) The transmission interface circuit 11 in each controller station includes the drivers 53a and 53b connected through the transmitting conductors 35a and 35b to the associated portions of the transmission lines 7a and 7b respectively, so that failure occurring in one of the transmission lines, for example, the transmission line 7a may not affect the other transmission line 7b.

(iii) The bypass operation in any one of the controller stations will not be attained when such a station is disabled and the failure diagnostic circuit is also disabled. In order to minimize the above probability, a false failure signal is periodically generated by the CPU and is transmitted round the transmission lines for the purpose of confirming the capability of the bypass operation. In this manner, the probability of occurrence of failure in the controller stations can be minimized prior to the plant control.

(3) Data transmission by way of the transmission lines will be temporarily interrupted when the line bypass test is conducted for each of the individual controller stations. In order to shorten the transmission interruption time, the diagnostic station is provided to control the diagnosis starting timing thereby realizing the desired high reliability without appreciably lowering the transmission efficiency.

The manner of monitoring the transmission right signal (the go-ahead signal) in the embodiment of the present invention will be described with reference to FIGS. 9 and 10.

Figure 9:
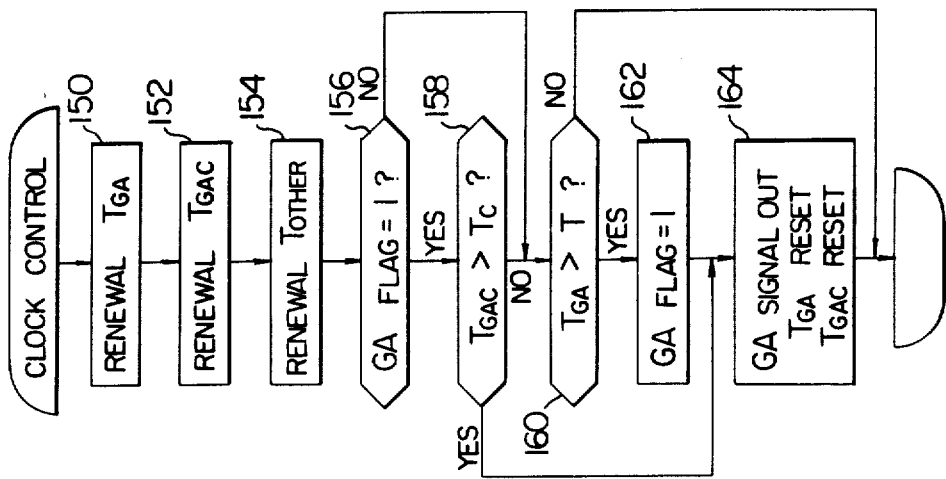
FIGS. 9 and 10 are flow charts illustrating how the transmission right signal (the GA signal) is monitored in the embodiment of the present invention.
Figure 10:
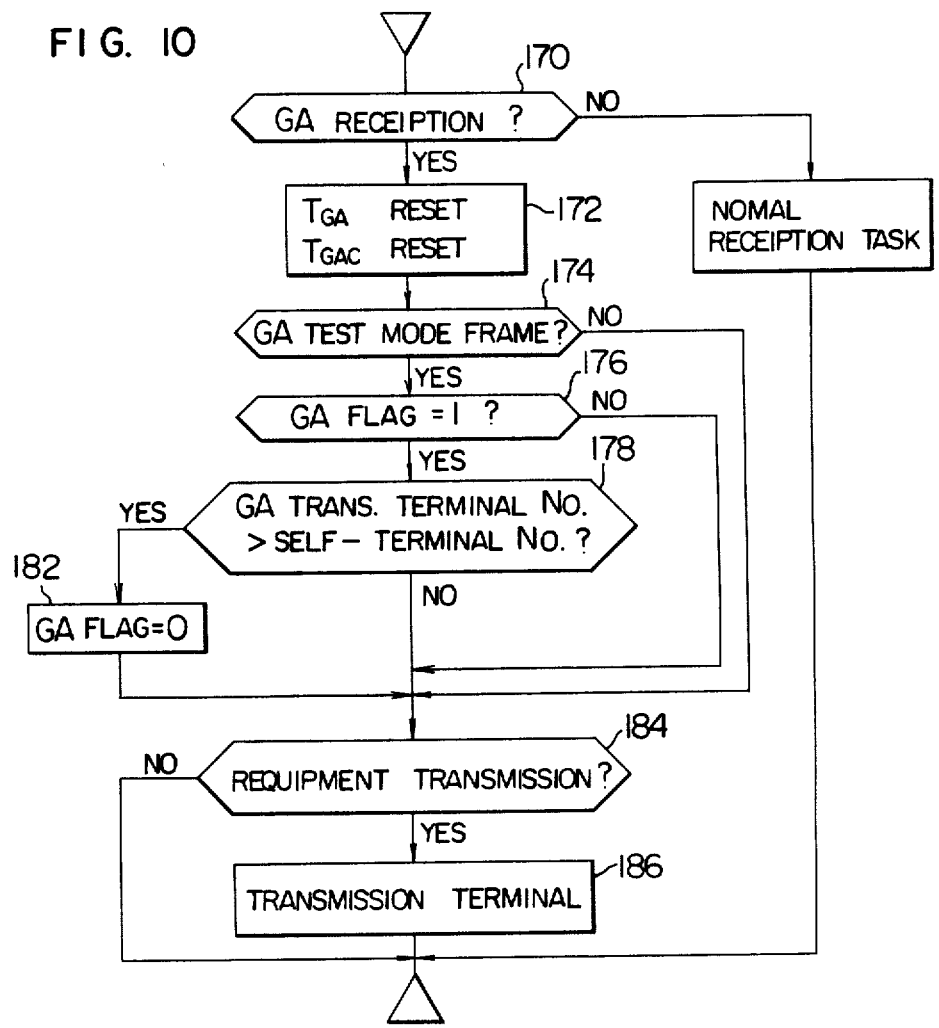

The clock control routine shown in FIG. 9 starts in response to an interrupt signal applied from a hard timer when a predetermined time interval has lapsed. In a processing step 150, a GA monitoring soft timer $T_{GA}$ is renewed. In a processing step 152, a GA cycling soft timer, $T_{GAC}$ is renewed. In a processing step 154, other soft timers $T_{OTHER}$ are renewed. The step 154 is followed by a process for timeout of the GA monitoring timer $T_{GA}$ and GA cycling timer $T_{GAC}$. This process proceeds when the result of judgment in a judging step 156 proves that a GA monitor flag is "on". In a judging step 158, whether or not $T_{GAC}$ is larger than a time interval $T_C$ allowed to the station having the transmission right for data transmission is judged when the GA monitor flag is "on", and the GA cycling timer $T_{GAC}$ is subjected to timeout when the result of judgment proves that $T_{GAC} > T_C$. In a judging step 160, whether or not $T_{GA}$ is larger than a time interval T during which the GA signal is detected by other stations is judged when the result of judgment in the step 156 is "no" or the result of judgment in the step 158 is also "no". When the result of judgment in the step 160 proves that $T_{GA} > T$, the GA monitor flag is turned on, and the GA monitoring timer $T_{GA}$ is subjected to timeout in a processing step 162. Then, the GA signal is delivered from the particular station, and both of the GA monitoring timer $T_{GA}$ and the GA cycling timer $T_{GAC}$ are reset in a processing step 164.

The manner of processing in a station upon reception of the GA signal will next be described with reference to FIG. 10. In a judging step 170, judgment is made as to whether or not the GA signal including identification such as serial number of the station from which the GA signal is transmitted has been received by the particular station. When the result of judgment proves that such a signal has not been received, the normal reception task is executed in a processing step 172. On the other hand, when the result of judgment proves that the GA signal has been received, both the GA monitoring timer $T_{GA}$ and the GA cycling timer $T_{GAC}$ are reset in a processing step 174. Then, in a judging step 176, judgment is made as to whether or not the signal includes a GA test mode frame. When the result of judgment is "yes", whether or not the GA monitor flag is "on" is judged in a judging step 178. When the result of judgment is "yes", the serial number of the transmit station is compared with that of the particular station in a judging step 180. When the result of judgment proves that the former is larger than the latter which means that the former station is located downstream of the latter station, the GA monitor flag is turned off in a processing step 182. On the other hand, when the result of judgment proves that the latter is larger than the former, whether or not the transmission is required is judged in a judging step 184, and, when the result of judgment is "yes", the transmission treatment is executed in a processing step 186.

The time settings of the GA monitoring timer and GA cycling timer will be described now. Generally, one of the controller stations participates in the monitoring of the GA signal. Therefore, in order that a plurality of GA signals may not unnecessarily be present on the loop transmission channel, the relation between the time setting of the GA monitoring timer and that of the GA cycling timer in each controller station is so selected as to satisfy the expression $T_{GA} \geq T_{GAC} + 2 \cdot T_q$, where $T_q$ represents the quantizing error of the cycling timer in each controller station.

Figure 11:
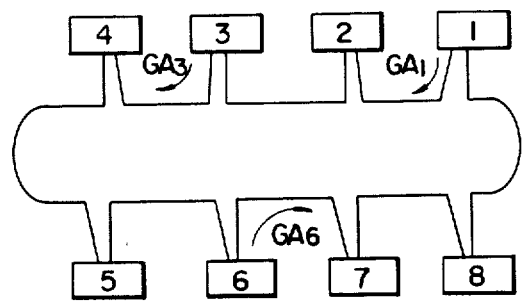
FIG. 11 shows the arrangement of a plurality of controller stations to illustrate how only one GA signal is selected by the steps of monitoring explained with reference to FIGS. 9 and 10.

A plurality of controller stations are to be connected in a manner as described later with reference to FIG. 11 in order to minimize the transient time elapsed after disappearance of the GA signal from and before appearance of the GA signal on the loop transmission channel. When the controller stations may not be connected in the order described later with reference to FIG. 11, the time setting $T_{GA,k}$ of the GA monitoring timer in a k-th station is selected to be $$T_{GA,k} = k \cdot C_1 + C_2.$$

where $C_1$ and $C_2$ indicate the time difference in monitor timing between two adjacent stations and the monitor time for the most upstream station, respectively.

The effect of the present invention when applied to the control of a plurality of controller stations connected in a predetermined order to a loop transmission channel will be described with reference to FIG. 11 and Table 1. Each of the plural controller stations monitors the presence or absence of the GA signal with its own GA monitoring timer. Suppose that the time settings of the GA monitoring timers in all of the stations are the same for the sake of simplicity of explanation. Then, upon disappearance of the GA signal from the loop transmission channel, the GA monitoring timers of all of the stations will time out at approximately the same time, and the GA signals will be transmitted from all of the stations. In the station arrangement shown in FIG. 11, it is now supposed that the first station is disabled, and the second, third and sixth stations transmit the GA signals at substantially the same time.

TABLE 1

|  | $t_1$ | $t_2$ | $t_3$ | $t_4$ | $t_5$ |
|---|---|---|---|---|---|
| 1st terminal | 1 | 0 | 0 | 0 | 0 |
| 2nd terminal | 0 | 0 | 1 | 1 | 1 |
| 3rd terminal | 0 | 0 | 1 | 0 | 0 |
| 6th terminal | 0 | 0 | 1 | 0 | 0 |
| Other terminals | 0 | 0 | 0 | 0 | 0 |
| GA signal | 1 | 0 | 3 | 1 | 1 |

It will be seen in Table 1 that, at time $t_1$, the first station functions as the GA monitoring station, and only one GA signal is present on the loop transmission channel. Suppose now that the first station is disabled at time $t_2$, and the GA signal disappears from the transmission channel. Then, the GA monitoring timers in the remaining stations are energized. In Table 1, it is supposed that, due to asynchronization of the clock pulses, the GA monitoring timers in the second, third and sixth stations only time out, and these stations function as the GA monitoring stations. Consequently, at time $t_3$, these three stations transmit the GA signals bearing the terminal numbers of the transmit stations respectively. Thus, for example, the third station receives the GA signal transmitted from the second station, and the terminal number of the third station is compared with that of the second station having transmitted the GA signal. Since the relation of the self-terminal number > the GA transmit terminal number holds in the stations except for the second station, the third and sixth stations withdraw from functioning as the GA monitoring stations at time $t_4$. Consequently, at time $t_5$, the second station alone remains to function as the GA monitoring station, and the control proceeds with only one GA signal being present on the transmission loop.

The GA monitoring mechanism according to the present invention provides various advantages as described presently.

(1) The GA signal used for controlling regularity of data transmission through the loop transmission channel can be produced by a symmetrical arrangement of hardware and software in all of the controller stations. This arrangement is advantageous in that the procedure for acquiring the transmission right in a normal station can be simplified, and, even when such a station is rendered abnormal or disabled, the station can be restored to the normal condition in a short recovery time.

(2) In the event that a plurality of GA signals appear simultaneously on the transmission loop, all of such stations, except for one of them, withdraw from functioning as GA monitoring stations as a result of the above manner of comparison between the self-terminal number and the terminal number of the GA transmit station. Thus, only one GA signal to be present on the transmission loop can be selected or determined by a simple process.

(3) In the event that the station assigned for monitoring the GA signal is disabled, and the GA signal disappears, a plurality of GA signals are re-produced by the GA monitoring timers in the remaining stations. Because of the station arrangement in which the stations are arranged in such an order that the terminal number increases in the direction of signal flow, the state of simultaneous presence of a plurality of GA signals on the transmission loop can be readily turned into the state of presence of only one GA signal on the transmission loop by execution of substantially a single transmit process. Thus, the transmission interruption time due to failure of the GA monitoring station can be shortened.

(4) The difference between the time setting of the GA monitoring timer and that of the GA cycling timer is selected to be two times as large as the quantizing error of the timer. Thus, when the GA signal disappears, only one GA monitoring station present on the transmission loop at that time can transmit the GA signal with the timeout of its GA monitoring timer before another GA signal appears. Therefore, the probability of transmission interference due to the simultaneous presence of two or more GA signals on the transmission loop can be reduced.

(5) In the event that the station participating in the monitoring of the GA signal is disabled, the GA monitoring time is determined in dependence on the terminal number, so that the number of stations participating temporarily in the monitoring of the GA signal can be reduced even when the stations are not orderly arranged on the transmission loop. This is advantageous in that the transient time required until only one GA signal is selected can be shortened to shorten the duration of transmission interference.

In accordance with the present invention, the GA monitoring mechanism above described is employed in combination with the self-diagnostic function of each controller station, the transmission-line switch-over and disconnect function of each controller station and the N:1 backup function of the N:1 backup station so as to improve the reliability of the transmission system in which all the stations are equivalently connected to the transmission channel including the two transmission lines.

Further, due to the fact that the transmission interface circuit and the self-diagnostic switch-over and disconnect circuit associated directly with the transmission system can be made common to all of the stations, such circuits are suitable for large scale integration.

Furthermore, due to the fact that the number of the controller stations of the same structure can be increased or decreased as desired, the scale of the plant control system can be easily changed by merely increasing or decreasing one or more of the controller stations. Thus, the expansibility of the plant control system is high.

Although only one display station 5 is illustrated in the aforementioned embodiment of the present invention, it is apparent that a plurality of display stations 5 can be connected to the transmission lines 7a and 7b by merely increasing the number of switches 9a and 9b. This is advantageous in that, when any one of the display stations is disabled, another display station takes over the function of the disabled station so that the function of the plant control system may not be reduced. Further, the reliability of the display function or backup function can be further improved by comparison and collation of the status of the plant control system between the plural display stations or between one of the display stations and the N:1 backup station.

It will be understood from the foregoing detailed description that, in the plant control system according to the present invention, each of the stations including the controller stations includes a transmission interface circuit and a self-diagnostic switch-over and disconnect circuit common to all of the stations, and all of the controller stations equivalently participate in data transmission between each other under control of a microcomputer built into each of them. Therefore, failure of proper operation of any one of the controller stations may not adversely affect the operation of the others. Thus, the plant control system of the present invention can operate with high reliability, can be expanded in scale as desired and can be easily provided in an LSI form.

What is claimed is:

1. A loop communication system comprising a plurality of controller stations, at least one display station including means for displaying the status of each of said controller stations, and a loop transmission channel through which said controller stations and said display station are connected in a loop to permit data transmission between said controller and display stations while giving a transmission right to each of said controller and display stations in sequential order so that the station to which the transmission right is given is allowed to send out into the transmission channel data originating in that status, wherein each of said controller and display stations comprises a transmission interface circuit and a self-diagnostic circuit connected to said loop transmission channel, said transmission interface circuit in each station including means for effecting data transmission with the other stations by way of said transmission channel, and said self-diagnostic circuit in each station including means for diagnosing the operation of its station for the presence or absence of a malfunction and for disconnecting its station from said transmission channel when it diagnoses that its station is disabled, wherein said transmission channel includes loop transmission lines arranged in duplex, said transmission interface circuit in each station including means for receiving data from and applying data to one of said transmission lines for effecting data transmission between its station and the other stations by way of said one transmission line, and said self-diagnostic circuit in each station including means for selecting said one of said transmission lines and for disconnecting its station from said selected transmission line when it diagnoses that its station is disabled, and wherein said transmission interface circuit includes first selector means for selecting data received through one of said two loop transmission lines, register means for registering the received data selected by said first selector means, second selector means connected to said first selector means and said register means for selecting the data registered in said register means when the transmission right for data transmission over said selected transmission line has been received and for selecting the data supplied from said first selector means when the transmission right has not been received, transmission control circuit means for receiving the data selected by said second selector means and for processing said received data thereby producing processed data, and third selector means for selecting either the processed data or the data transmitted by the selected one of said transmission lines according to a signal determining a transmission mode and for supplying the data selected by said third selector means to the selected one of said two transmission lines; and said self-diagnostic circuit in each station includes first circuit means for receiving the data transmitted through said selected one of said transmission lines and for producing a first signal when said received data meets predetermined requirements indicating that the received data is normal, second circuit means for receiving the data transmitted to said selected one of said transmission lines and for producing a second signal when said received data meets predetermined requirements indicating that the received data is normal, and third circuit means for receiving a signal originating in the station having that third circuit means and producing a third signal when said received signal meets predetermined requirements indicating that the received signal is normal, and an AND gate connected to receive said first, second and third signals and producing a signal to select one of said transmission lines in the presence of all of said first, second and third signals.

2. A loop communication system as claimed in claim 1, further comprising a backup station including means for executing the plant control in lieu of a disabled one of said controller stations, said backup station being also connected to said transmission channel, said display station displaying also the status of said backup station.

3. A loop communication as claimed in claim 1, further comprising means for monitoring the presence or absence of the transmission right signal on said transmission channel, and means for confirming that only one transmission right signal is present on said transmission channel.

4. A plant control system as claimed in claim 1, wherein the data supplied from said register means to said second selector means comprises said data received by said register means and delayed by a predetermined time interval.

5. A plant control system as claimed in claim 1, wherein each of said first, second and third signals is a signal of constant voltage level.

* * * * *